United States Patent [19]

Hood, Jr.

[11] Patent Number: 4,579,657

[45] Date of Patent: Apr. 1, 1986

[54] FLUID FILTER AND METHOD OF CONSTRUCTION

[75] Inventor: James H. Hood, Jr., Knoxville, Tenn.

[73] Assignee: Filmax, Incorporated, Knoxville, Tenn.

[21] Appl. No.: 669,764

[22] Filed: Nov. 8, 1984

[51] Int. Cl.$^4$ .................... B01D 25/02; B01D 29/06
[52] U.S. Cl. .................................. 210/314; 210/317; 210/434; 210/439; 210/440; 210/443; 210/483
[58] Field of Search ............... 210/232, 314, 317, 345, 210/347, 434, 437, 439, 440, 443, 483

[56] References Cited

U.S. PATENT DOCUMENTS

| | | | |
|---|---|---|---|
| 2,076,934 | 4/1937 | Burckhalter | 210/134 |
| 2,076,936 | 4/1937 | Burckhalter | 210/134 |
| 2,311,320 | 2/1943 | Williams | 210/440 X |
| 2,543,165 | 2/1951 | Harlan | 210/440 X |
| 2,739,713 | 3/1956 | Robinson | 210/437 X |
| 2,868,383 | 1/1959 | Nicolls | 210/323 |
| 2,881,141 | 4/1959 | Smythe | 260/2.5 |
| 2,895,615 | 7/1959 | Oathout | 210/439 |
| 3,105,042 | 9/1963 | Roosa | 210/94 |
| 3,154,487 | 10/1964 | Thornton et al. | 210/323 |
| 3,308,956 | 3/1967 | Yee et al. | 210/439 X |
| 3,390,778 | 7/1968 | Uhen | 210/440 X |
| 3,465,883 | 9/1969 | Jumper | 210/307 |
| 3,487,942 | 1/1970 | Lee et al. | 210/439 |
| 3,504,803 | 4/1970 | Brayman | 210/439 |
| 3,537,592 | 11/1970 | Ogden et al. | 210/345 X |
| 3,696,932 | 10/1972 | Rosenberg | 210/437 |
| 3,988,244 | 10/1976 | Brooks | 210/440 X |
| 4,017,400 | 4/1977 | Schade | 210/439 |
| 4,366,057 | 12/1982 | Bridges et al. | 210/437 |
| 4,422,790 | 12/1983 | Gebert et al. | 210/232 X |

FOREIGN PATENT DOCUMENTS

| | | | |
|---|---|---|---|
| 13219 | 4/1972 | Japan | 210/440 |
| 808154 | 1/1959 | United Kingdom | 210/440 |

*Primary Examiner*—Robert Spitzer
*Attorney, Agent, or Firm*—Luedeka & Neely

[57] ABSTRACT

The specification discloses a filter apparatus including spirally wound tissue layer filter elements for filtering fluid and a seal between the filter elements to prevent fluid from bypassing the filter elements. A flow tube extends through the center of the filter elements. A resiliently deformable mesh spacer is located on the flow tube between the filter elements to insure formation of a radial passageway therebetween. The seal is applied between the filter elements along their circumferential edges in a melted state and migrates into and between the tissue layers and interstices of the filter elements and the mesh of the spacer. As the seal cools and hardens it adheres to the filter elements and the spacer. A seal may likewise be applied between the filter elements and the flow tube. Application of the seals in this manner prevents fluid flow communication between the area outside of the filter elements and the radial passageway except by means of passage of fluid between the layers of tissue in the filter elements so that the filtering function is maximized.

23 Claims, 9 Drawing Figures

FLUID FILTER AND METHOD OF CONSTRUCTION

This invention relates to filters for filtering fluids such as lubricating oil and hydraulic oil, and more particularly relates to a filter apparatus having structure which prevents unfiltered fluid from bypassing the filter elements and contaminating the filtered fluid.

Filters for removing accumulations of undesirable matter from fluids are well known and there exist many variations of the same for use in a wide variety of applications. Most such filters have inflow and outflow connections or ports located on a shell and one or more filter elements located within the shell. Where two or more filter elements are used, a space is often maintained between the filter elements and the shell for containing the unfiltered fluid before it enters the filter elements. One type of filter uses cylindrical filter elements of the wound tissue type providing for axial fluid flow between the layers of tissue where the undesirable matter is removed. The fluid enters one end of the cylindrical filter element and exits from the other end. Provision is then made to pass the fluid through the outflow port where it returns to the fluid source.

In most modern applications, the pressure difference between the unfiltered fluid in the space outside the filter elements and the filtered fluid exiting the filter element can be about 50 p.s.i. This difference in pressure produces substantial hydraulic compression on the filter elements which tends to deform and distort the elements, especially around the circumferential edges and the ends. Moreover, the pressure difference is often cyclic, subjecting the filter elements to alternating periods of relaxation and compression which further distorts and weakens the tissue layer structure of the filter elements around their edges.

Heretofore, attempts have been made to prevent unfiltered fluid from passing from the space outside the filter elements into the area where filtered fluid is exiting the filter elements along one edge of the tissue layers. For example, in U.S. Pat. No. 4,017,400 to Schade there are disclosed interlocking annular seals inserted into the filter elements a few layers inwardly from the outer perimeter of the filter elements and a few layers outwardly from the core of the filter elements. This type of seal has been found to experience decreased effectiveness in practice due to formation of flow channels around the seal where it is inserted into the filter elements. Moreover, it has been found that the cyclic nature of the pressure difference sometimes causes layers of tissue to flip past the part of the seal inserted into the layers and move toward the center of the filter elements. This may allow unfiltered fluid to travel directly out of the filter apparatus without passing through the layers of tissue thereby reducing the effectiveness of the apparatus.

Another attempt to solve this problem can be found in U.S. Pat. No. 4,366,057 to Bridges where an annular ring similar to the annular seal of Schade is used in combination with a sealing membrane. Alternatively, Bridges shows the use of metal plates configured similar to the seal of Schade in combination with the sealing membrane. The ring and metal plates of the type disclosed by Bridges are subject to the same inherent problems in actual practice as is the annular seal of Schade. A membrane of the type disclosed by Bridges is likewise subject to formation of flow channels between the membrane and the filter elements thereby allowing passage of fluid from the area outside of the filter elements into the flow passageway between the elements. And even though the membrane is elastic, it must be placed around the elements with an initial degree of tightness far in excess of which might be required to prevent formation of flow channels so that when the elements are radially compressed the membrane is still tight enough to perform its function. If the membrane is not tight enough initially, when the filter elements compress flow channels will tend to form between the membrane and the filter elements. But even if the membrane is properly applied, it must by its very nature compress the filter elements and create a restrictive effect on axial flow through the tissue layers. And to prevent formation of flow channels, this restrictive effect will of necessity be substantial. This flow restriction causes a larger pressure difference between the fluid outside the filter elements and fluid exiting the filter elements resulting in increased deformation and distortion of the filter elements, increased tendency of the layers of tissue to flip by the annular ring and lower flow rates through the filter.

A need has thus arisen for an oil filter with a seal which prevents undesirable fluid flow communication between unfiltered fluid outside the filter elements and filtered fluid exiting the filter elements, and which does not restrict the flow of fluid through the filter.

The present invention fulfills this need and thereby solves the foregoing and other problems long associated with fluid filters through the provision of a seal between two or more filter elements which prevents unfiltered fluid from bypassing the filter elements and contaminating the filtered fluid.

In accordance with the present invention, a filter apparatus is provided including at least first and second filter elements. Each of the elements has a centrally located passageway. A flow tube is disposed within the passageways of the filters and the filter elements are coaxially disposed adjacent each other on the tube. A shell receives and contains the filter elements and flow tube. A first port located on the shell provides fluid flow communication between the source of fluid and the flow tube and a second port also located on the shell provides fluid flow communication between the source of fluid and the filter elements. A spacer is disposed between the filter elements to form an annular passageway therebetween. The spacer extends radially outwardly from near the flow tube to near the outer edge of the filter elements. A central passageway is disposed on the flow tube adjacent the annular passageway to provide fluid flow communication between the annular passageway and the tube. An outer seal is disposed between the filter elements and extends radially outwardly from adjacent the outer edge of the spacing means to the outer circumferential edge of the filter elements. The outer seal extends around the periphery of the filter elements and adheres to each of the filter elements adjacent the seal around its circumference and along its radial length to prevent unfiltered fluid from contaminating the filtered fluid.

In accordance with another aspect of the invention, the spacer comprises a first and a second half with a spacer washer located therebetween. Each of the spacer halves comprise an annular disk and a circular ring extending downwardly and outwardly from the outer edge of the disk. The circular ring extends around the perimeter of the disk so that each of the spacer halves forms a truncated cone. The annular disk of each half has a centrally located aperture of about, but greater than, the dimension of the cross-section of the center tube. The disk and ring of each half are continuous and comprise a semi-rigid resiliently deformable mesh.

In accordance with yet another aspect of the present invention, the outer seal adheres to the mesh of the spacer halves and extends radially outwardly from the interstices of the mesh adjacent the outer seal to the outer edge of the filter elements, and extends axially between the filter elements so that a unitary construction results between the spacer halves, the filter elements and the outer seal.

In accordance with a further aspect of the present invention, the filter elements have beveled edges extending around the circumference of their passageways. The filter elements are oriented on the flow tube so that the beveled edges face each other. Inner seals are disposed around the flow tube in the annular space between the beveled edges of the filter elements and the flow tube, the inner seals adhering to both the flow tube and the filter elements and generally filling the annular space formed by the bevels.

In accordance with still another aspect of the present invention, each of the inner seals and the outer seal comprise a thermoplastic material having a melting temperature higher than the highest expected operating temperature of the filter apparatus.

In accordance with an additional aspect of the present invention, a method is disclosed for constructing a seal between two filter elements having a spacer located therebetween and an axially oriented flow tube extending through their centers. The method includes positioning one of the filter elements on the flow tube and locating the spacer on the flow tube adjacent the filter element. The other filter element is positioned on the flow tube adjacent the spacer so that the spacer is between the two filter elements. A sealing material is heated to above its melting temperature which is higher than the highest expected operating temperature of the filter elements. The sealing material is then applied by flowing the melted material between the filter elements around their outer radial edges so that the material extends radially from the outer edge of the spacer to the outer edges of the filter elements and extends axially from the end of one filter element adjacent the spacer to the end of the other filter element adjacent the spacer. The sealing material is then allowed to cool to below its melting temperature so that the seal adheres to the filter elements and the spacer.

The advantages and further aspects of the present invention will be readily appreciated by those of ordinary skill in the art as the same becomes better understood by reference to the following detailed description when considered in conjunction with the accompanying drawings in which.

Figure 5A:
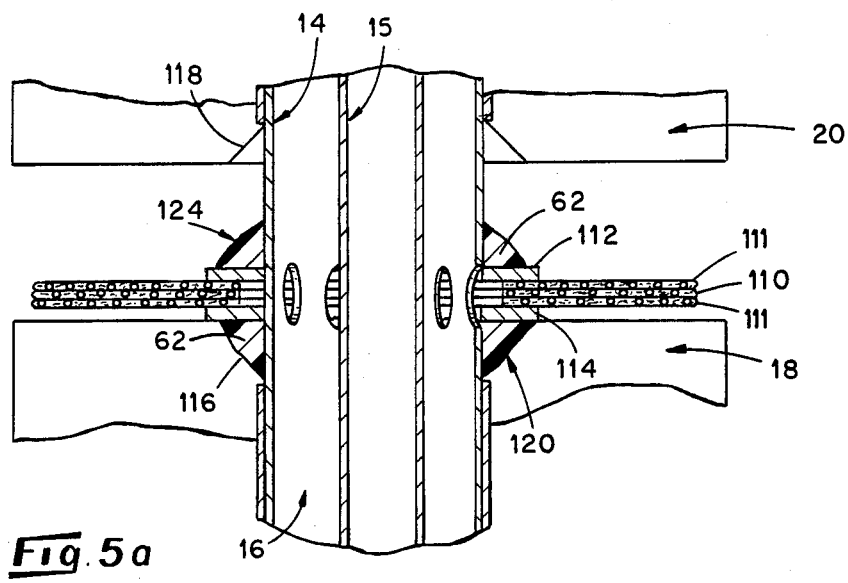
Figure 5B:
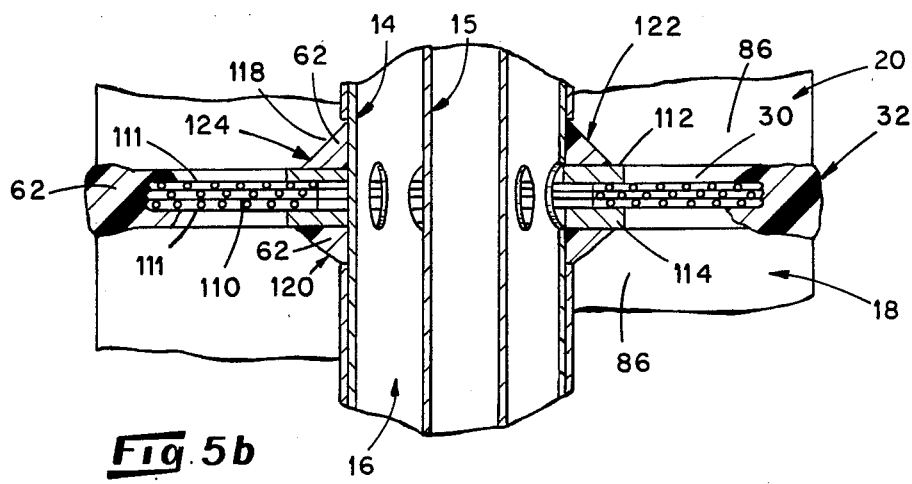
Figure 6:
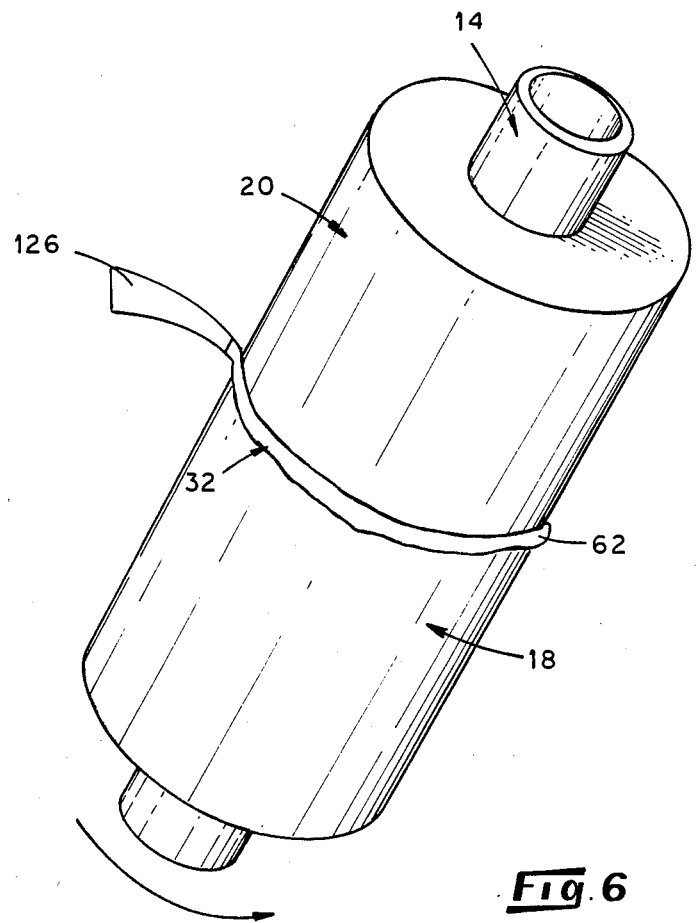

FIGS. 5a and 5b are cross-section views of an alternate embodiment of the present invention illustrating in sequence the formation of the inner seals between beveled edges of the filter elements and the outer flow tube and formation of the outer seal between the filter elements, and also showing the use of a plurality of spacer disks and two spacer washers; and FIG. 6 is a perspective view illustrating one method of forming the outer seal between the filter elements.

Figure 1:
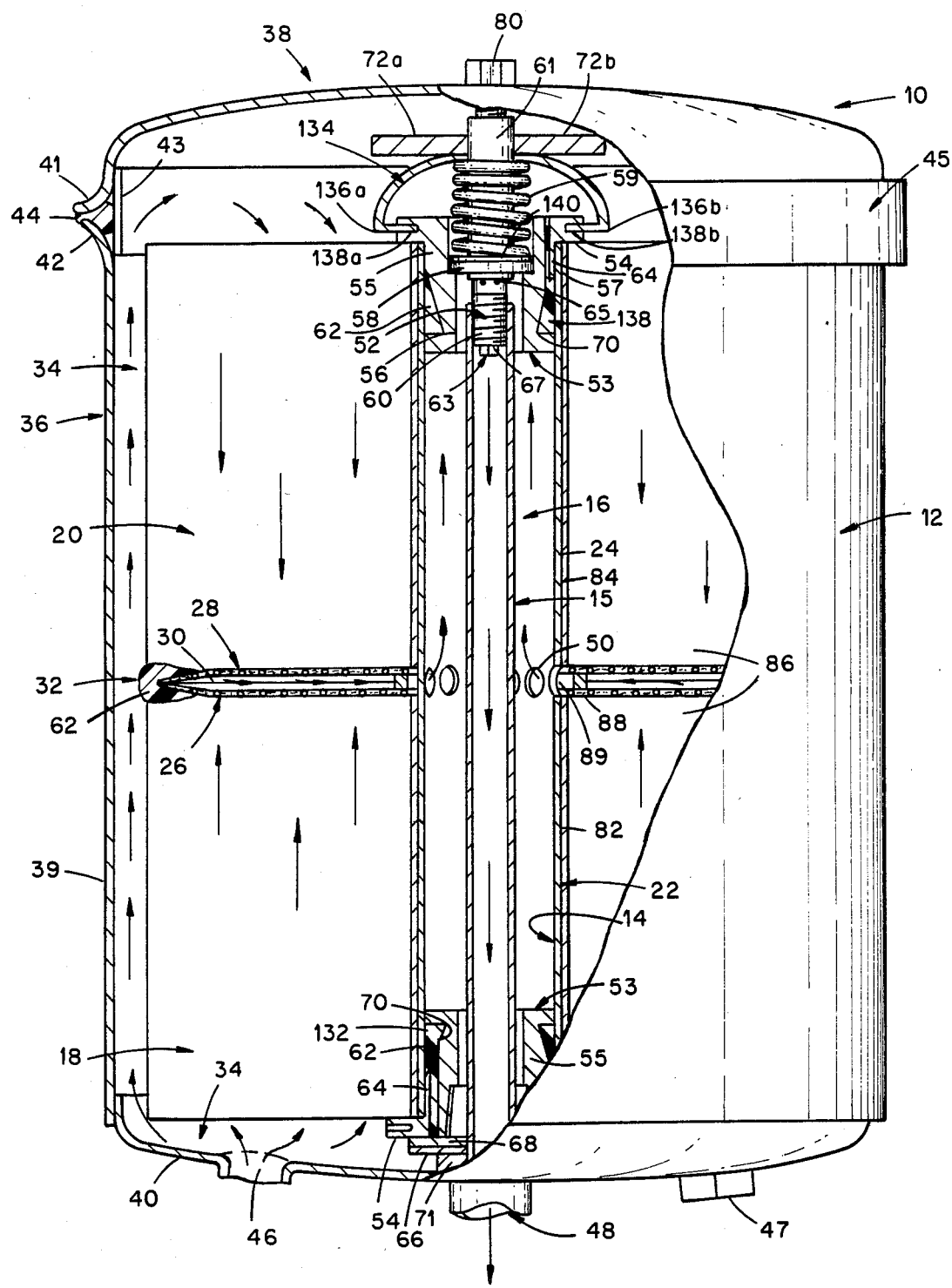
FIG. 1 is a cross-section view of a filter apparatus embodying one form of the present invention showing two filter elements, inner and outer flow tubes, a pair of plugs at opposite ends of the outer flow tube, a spacer located between the filter elements, and an outer seal located between the filter elements around their outer radial edges.

Referring now to the drawings in which like reference characters refer to like or similar parts throughout the several views, there is shown in FIG. 1 an axial flow filter apparatus 10 embodying a preferred form of the present invention. The filter 10 includes a cylindrical shell 12 housing therein a centrally located outer flow tube 14 extending generally along the length of the filter 10. An inner flow tube 15 is concentrically located within the outer flow tube 14 and provision made for providing fluid flow communication between the flow tubes 14 and 15 (discussed below). An axial passageway 16 extends generally along the length of the outer tube 14 between the outer tube 14 and the inner tube 15. First and second spirally wound tissue layer filter elements 18 and 20 are mounted on the outer flow tube 14 which extends through centrally located tube passageways 22 and 24 in the filter elements 18 and 20. Means for spacing apart the filter elements 18 and 20 are provided in the illustrated embodiment and preferably include first and second spaced apart annular discs 26 and 28 forming therebetween an annular passageway 30 extending radially outwardly from adjacent the outer flow tube 14 to near the outer edge of the filter elements 18 and 20. A non-porous outer seal 32 is located between the filter elements 18 and 20 around their outer radial edges to prevent undesirable fluid flow communication between the annular passageway 30 and a fluid space 34 on the outside of the filter elements 18 and 20.

In the illustrated embodiment of FIG. 1, the shell 12 is shown to include a canister section 36 and a dome section 38. The canister 36 includes a cylindrical side wall 39 and a bottom 40 attached to the lower end of the wall 39. The bottom 40 is configured to be received by the wall 39 on its lower end with an interference fit and suitable means are employed to seal the bottom 40 and wall 39 where they are joined together. The seal employed is preferably a permanent seal secured by welding the wall 39 and bottom 40 together. The canister and dome sections 36 and 38 each include radially outwardly extending lips 42 and 41, respectfully. The lip 41 extends around the lower edge of the dome 38 and the lip 42 extends around the upper edge of the cylindrical member 39 of the canister 36. The inside diameters of the dome 38 and cylindrical side wall 39 are essentially equal so that the lips 41 and 42 are in an opposing relationship at the junction between the dome 38 and the canister 36. A retaining sleeve 43 is attached to the side wall 39 at the upper end of the wall 39 where the lip 42 extends from the wall 39. A circular seal 44 is placed in the space between the retaining sleeve 43 and the lip 42 and is preferably formed from neoprene. When the filter elements 18 and 20 and other components have been placed inside the canister 36, the dome 38 is placed on the canister 36 so that the lip 41 engages the seal 44 and the upper part of the retaining sleeve 43 rests near the inside surface of the dome 38. A tightening band 45 is then used to compress the dome 38 against the canister 36 so that the lips 41 and 42 are urged towards each other whereby the seal 44 is compressed in the space between the lips 41, and 42 and between the lips 41 and 42 and the sleeve 43. In this manner, the junction between the dome and canister is tightly sealed, preventing leakage from within the filter 10 during high pressure operation.

The canister and dome sections 36 and 38 are preferably formed from a thin lightweight metal having sufficient strength to withstand the pressure expected within the filter 10 without deforming or rupturing.

First and second shell ports 46 and 47 are located on the bottom 40 and provide fluid flow communication between the source of fluid and the fluid space 34. Alternatively, one of the ports 46 and 47 may be used as a drain to empty the filter 10 prior to removing it from the source of fluid. The ports 46 and 47 may alternatively be located on another part of the shell 12 where particular requirements make placement more feasible or economical. And, in many applications a single port would suffice.

The inner flow tube 15 is open at one end forming a tube port 48 providing fluid flow communication between an external fluid reservoir (not shown) and the inner flow tube 15. A preferred means for providing fluid flow communication between the annular passageway 30 and the axial passageway 16 within the outer flow tube 14 includes a plurality of spaced apart apertures 50 which are disposed around the outer flow tube 14 and are located generally in a plane perpendicular to the axis of the outer tube 14. The apertures 50 are located on the outer tube 14 between the planes made by the annular discs 26 and 28 so that fluid flow communication is achieved between the annular passageway 30 and the axial passageway 16.

The inner flow tube 15 is shown in FIG. 1 extending to near the upper end of the second filter element 20 and is threaded on its inner surface to receive a tightener screw 52 which has a lower threaded part 60 and an upper unthreaded part 61. A well 63 (not visible) extends from the end of the threaded part 60 into the screw 52 past the transition between the threaded and unthreaded parts 60 and 61. A plurality of spaced apart apertures 65 are located just below the transition and provide a means of fluid flow communication between the axial passageway 16 and the well 63. Fluid flowing into the apertures 65 enters the well 63 and flows from there into the inner flow tube 15 and out of the filter apparatus 10. An adjustable orifice 67 is attached to the end of the threaded part 60 at the opening of the well 63 to control the rate of fluid flow therethrough. A pair of oppositely directed handles 72a and 72b extend radially outwardly from near the top of the unthreaded part 61 of the screw 52 so that an assembler may tighten the filter elements 18 and 20 by hand on the inner flow tube 15. Other suitable means for tightening the filter elements 18 and 20 on the inner flow tube 15 will also suffice.

A pair of plugs 53 are shown located in opposite ends of the outer flow tube 14. The plugs 53 are essentially identical and in addition to the functions described below, aid in supporting and maintaining the filter elements 18 and 20 and the outer flow tube 14 within the filter apparatus 10. Each plug 53 includes a disc-shaped lip portion 54 extending radially outwardly from one end of a sleeve portion 55. The sleeve 55 has an outer diameter dimensioned so that the plug 53 will fit tightly within the inside of the outer flow tube 14, and has an axially oriented passageway 56 with a diameter somewhat greater than that of the inner flow tube 15. The sleeve 55 is dimensioned axially so that when it is inserted into the outer flow tube 14 and the lip 54 engages the upper end of the second filter element 20, the sleeve 55 extends down into the outer flow tube 14 slightly below the upper end of the inner flow tube 15. An annular shoulder 57 is formed in the plug 53 by countersinking the passageway 56 to about one half its axial length. The surface of the counter sunk portion is beveled so that its diameter decreases slightly in the direction of the shoulder 57.

An upper sealing disk 58, preferably a rubber washer, is configured to fit within the countersunk portion of the plug 53. The outer diameter of the disk 58 is slightly less than the diameter of the countersunk portion at the end of the plug 53 and slightly greater than the diameter of the counter sunk portion at the shoulder 57. The inside diameter of the disk 58 is dimensioned so that the disk 58 will fit tightly on the unthreaded upper part 61 of the tightener screw 52. A spring 59 is dimensioned to fit in the counter sunk portion of the plug 53 between the disk 58 and the handles 72a and 72b.

Each plug 53 includes an annular space 70 formed within the plug between the plug 53 and the outer flow tube 14. The space 70 is shown in the illustrated embodiment having a triangular cross section for receiving therein a sealing material 62. The sealing material 62 serves to prevent filtered oil within the outer flow tube 14 from being contaminated by unfiltered oil in the fluid space 34 outside the filter elements. Preferably, the sealing material 62 is a thermoplastic material having a melting temperature higher than the highest expected operating temperature of the filter apparatus 10 and has adhesive properties in its hardened state. In the preferred embodiment, the sealing material 62 is applied in the space 70 by transmitting the material 62 in a melted state into the space 70 through a passageway 64 which extends from the end of the plug 53 adjacent the lip 54 to the space 70. As described below, the sealing material 62 should be applied after the plugs 53 are finally positioned within the outer flow tube 14. Alternately, the sealing material 62 can be applied directly in the space 70 without the use of the passageway 64 prior to placing the plugs 53 into the outer tube 14.

One of the plugs 53 is used to support and seal the first filter elements 18 and the outer flow tube 14 at the bottom 40 of the filter apparatus 10 where the inner flow tube 15 extends from the bottom 40. It should be noted that the inner flow tube 15 is securely attached to the center of the bottom 40 of the canister 36 concentric with the cylindrical side wall 39 of the canister 36. The inner tube 15 is also sealed, preferably by welding, where it extends from the bottom 40 to prevent leakage between the tube 15 and the fluid space 34 outside the filter elements 18 and 20. A spacer 71 is located around the inner tube 15 and rests against the bottom 40 of the canister 36, and is permanently sealed against the inner surface of the shell 12 and the inner flow tube 15. A washer 66 is placed on the spacer 71 and has an inner diameter slightly greater than the inner flow tube 15. The outer diameter of the washer 66 is slightly greater than the outer diameter of the sleeve portion 55 of the plug 53 but less than the diameter of the lip 54. The washer 66 is permanently sealed against the spacer 71 and washer 66. By sealing the spacer 71 and washer 66 in the manner described above, unfiltered fluid is prevented from flowing between the spacer 71 and the shell 12 up the outer surface of the inner flow tube 15 and into the outer flow tube 14 where it would contaminate filtered fluid. The sealing of the washer 66 against the spacer 71 and inner flow tube 15 also prevents contamination which would occur if fluid passed between the washer 66 and the spacer 71.

The washer 66 serves as a support for a lower annular sealing disk 68, preferably formed from neoprene which prevents fluid from flowing between the plug 54 and the washer 66. In the illustrated embodiment, the lower disk 68 has essentially the same inner and outer diameters as the washer 66 and is thick enough to allow the plug 54 to seat on its upper surface without undergoing deformation on its lower surface which could cause leakage. In this embodiment, an O-ring could be substituted for the sealing disk 68 to achieve the same sealing function.

The filter elements 18 and 20 are preferably constructed by winding a suitable weight tissue on cardboard tubes 82 and 84 to form spirally wound tissue layers 86. Passageways 22 and 24 therefore lie within tubes 82 and 84 of the first and second filter elements 18 and 20. Contaminants are removed from the fluid as it flows between the tissue layers 86. And it should be noted that in the illustrated embodiment, the filter elements 18 and 20 are secured on the outer flow tube 14 prior to inserting the flow tube 14 into the canister section 36.

The distance between the lower annular sealing disk 68 and the opposite end of the inner tube 15 adjacent the spring 59 is such that when the outer flow tube 14 is placed within the canister section 36 on the sealing disk 68, the handles 72a and 72b will not engage the top of the spring 59 until about half of the threaded part 60 of the screw 52 has entered the inner tube 15. In this manner the force of the spring 59 against the upper sealing disk 58 is sufficient to prevent unfiltered fluid in the space 34 outside the filter elements 18 and 20 from moving into the passageway 16 in the outer flow tube 14.

The uppermost center of the dome section 38 includes a vent plug 80 which is threadedly received from the outside of the dome 38. The vent plug 80 may be removed to bleed air out of the top of the filter 10. Immediately below the plug 80, the upper end of part 61 of screw 52 is received by a sleeve (not shown) that is welded to the dome section 38 in the conventional manner.

In the embodiment shown in FIG. 1 the filter elements 18 and 20 are separated, one from the other, by the first and second spaced apart annular disks 26 and 28. An annular spacer washer 88 is utilized to maintain a space between the disks 26 and 28 insuring formation and maintenance of the annular passageway 30 during operation of the filter apparatus 10. Also, the inner diameter of the washer 88 is larger than the outer diameter of the outer flow tube 14 by a sufficient amount to insure formation of a space 89 between the washer 88 and the outer surface of the flow tube 14. As described below, the space 89 provides flow communication between the annular passageway 30 and the apertures 50 in the outer flow tube 14.

The structure and function of the disks 26 and 28, the washer 88 and the outer seal 32 can be best understood by reference to FIGS. 2, 3, 4a, 4b, and 4c in conjunction with FIG. 1. The disks 26 and 28 each have a truncated cone shape and are oriented one with respect to the other so that the respective bases of their cone shaped configurations face each other. This can best be seen by reference to FIGS. 3 and 4a.

Figure 4A:
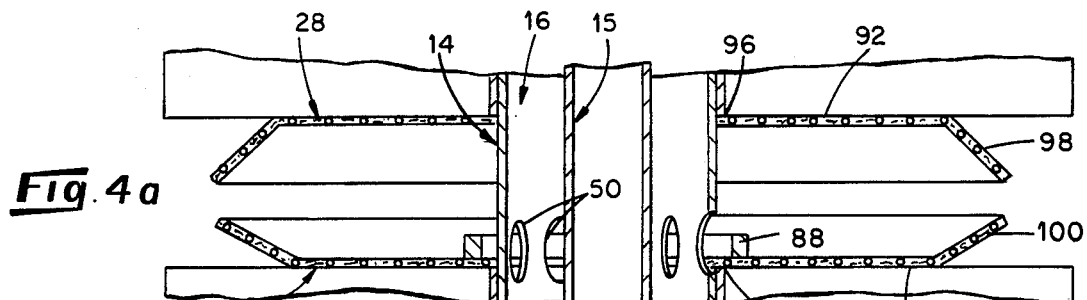
FIGS. 4a, 4b and 4c are cross-section views and illustrate in sequence the placement of the spacer halves on the outer flow tube and formation of the outer seal.
Figure 4B:
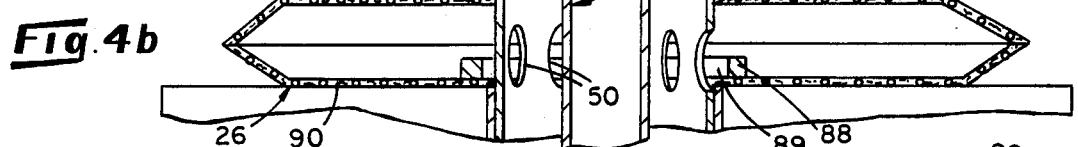

The disks 26 and 28 include generally flat annular regions 90 and 92. The annular regions 90 and 92 include centrally formed apertures 94 and 96 having diameters slightly greater than the outer flow tube 14. A circular ring 98 extends downwardly and outwardly from the annular region 92 and extends around the perimeter of the region 92. A similarly configured ring 100 extends from the annular region 90. Preferably, the rings 98 and 100 extend from the plane of the regions 92 and 90, respectively, at about a 45 degree angle. When the disks 26 and 28 are placed on the tube 14, the rings 98 and 100 are directed toward each other so that, as can be seen in FIG. 4b, they engage each other along their outer edges.

The disks 26 and 28 are fluid pervious and are preferably formed from a corrosion resistant wire mesh. In some applications, plastic, nylon or fiberglass mesh would be suitable. The spacing and thickness of the wires in the mesh is sufficient to provide a semi-rigid construction while allowing axial flow of fluid from the edges of the tissue layers of the filter elements 18 and 20 into the annular passageway 30. The spacing of the wires also allows flow of filtered fluid from the annular passageway 30 above and below the washer 88 (as viewed in FIG. 1) and into the space 89 which is between the washer 88 and the outer flow tube 14. Thereafter it flows from the space 89 through the apertures 50 into the axial passageway 16 between the outer flow tube 14 and the inner flow tube 15.

Figure 4C:
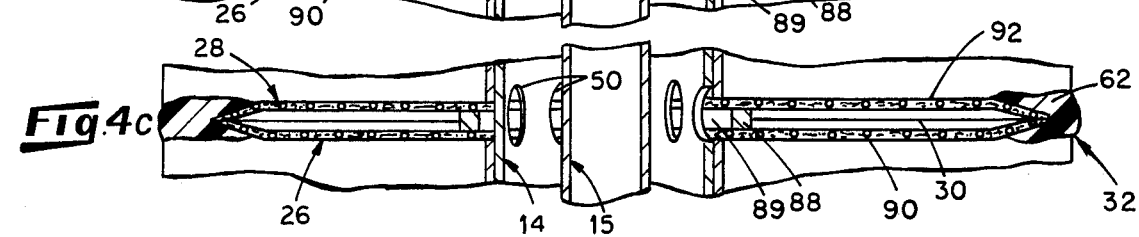

In the preferred embodiment, the mesh used is constructed from 0.025 diameter wire mesh with 10 by 10 wires per inch. The wire is annealed and coated with epoxy to resist corrosion. The wire used is also resiliently deformable so that the rings 98 and 100 may be formed around the perimeter of the annular regions 92 and 90, respectively by bending the edges of the disks 26 and 28, respectively. Also, the use of a mesh prevents crimping of the part of the disks 26 and 28 used to form the rings 100 and 98 because the wire's lattice structure adjusts as the mesh is deformed thereby varying the distance between the wires to conform to the new shape without wrinkling. Moreover, the resiliency of the mesh allows the disks 26 and 28 to be pressed against each other as shown in FIG. 4c while maintaining pressure against the filter elements 18 and 20, respectively.

It is to be noted that the rings 98 and 100 extend out from the annular regions 92 and 90 to near the edges of the filter elements 18 and 20. As can be seen in FIGS. 4a, 4b, and 4c, the diameter of the rings 98 and 100 increases as the disks 28 and 26 are compressed and, as shown in FIG. 4c, is slightly less than the diameter of the filter elements 18 and 20 when the annular regions 90 and 92 both engage the washer 88. In this manner, the outer edges of the rings 98 and 100 do not protrude beyond the edges of the filter elements 18 and 20 and interfere with application of the outer seal 32. The outer seal 32 is shown in FIGS. 1 and 4c extending between the layers of tissue 86 of the filter elements 18 and 20. The seal 32 is formed by applying the sealing material 62 between the filter elements 18 and 20 in a melted state. In the illustrated embodiments, the sealing material 62 used to form the outer seal 32 is a thermoplastic substance as stated above and has a melting temperature higher than the highest expected operating temperature of the filter apparatus 10. Also, the sealing material 62, in its hardened state, adheres to the tissue layers 86 and to the disks 26 and 28. And it is to be understood that use of other materials having similar properties and effecting the seal described herein would fall within the scope of the present invention.

By applying the sealing material 62 in a melted or liquid state, the absorptive properties of the tissue are utilized to aid migration of the sealing material 62 between the tissue layers 86 and into the interstices of the tissue itself. Moreover, the sealing material 62, being liquid, will flow between the wires of the mesh in the disks 26 and 28. As the sealing material 62 cools, it adheres to both the tissue with which it has made contact and to the mesh of the disks 26 and 28 through which it has migrated. Thus, a unitary construction results between the filter elements 18 and 20 and the disks 26 and 28 by virtue of the application of the sealing material 62. In this manner, fluid flow communication between the space 34 outside the filter elements 18 and 20 and the annular passageway 30 is prevented so that filtered fluid in the annular passageway 30 will not be contaminated by unfiltered fluid in the fluid space 34. Consequently, the outer seal 32 of the present invention offers significant advantages over the prior art by eliminating the above-noted contamination which has plagued prior devices. A further benefit of the seal 32 results when it is realized that by eliminating the aforesaid contamination, the relative amount of fluid flowing axially between the layers of tissue 86 is increased so that the filtering function of the apparatus 10 is improved.

Referring now to FIGS. 5a and 5b, there is shown an alternate embodiment of the present invention where a plurality of disks 110 and 111 are located between the filter elements 18 and 20. In these figures the sizes of the various elements and the spacing between them is exaggerated somewhat to clearly show the construction. The three disks 110 and 111 are preferably constructed from a wire mesh. The middle disk 110 is coarser and made of a larger gauge wire than the two outside disks 111. Thus, the middle disk 110 provides spacing between the filter elements 18 and 20 while the outer disks 111 provide a fine mesh barrier between the filter elements 18 and 20 and the middle disk 110 to prevent the filter elements 18 and 20 from crushing into the coarse mesh of the middle disk 110. Preferably, the middle disk 110 is constructed from 0.025 inch diameter wire mesh with 10 by 10 wires per inch and the disks 111 are 0.011 inch diameter wire mesh with 16 by 16 wires per inch. The wire in the illustrated embodiment is annealed and coated with epoxy before the mesh is formed so that corrosion will be inhibited. In some applications, plastic, nylon or fiberglass mesh would also be suitable. Washers 112 and 114 are located between one of the disks 111 and the second filter element 20 and between the other disk 111 and the first filter element 18, respectively.

As noted above, the filter elements 18 and 20 are placed on the outer flow tube 14 before the latter is placed in the canister section 36. In the past, it was customary to simply glue the filter elements on a centrally located flow tube but this practice has resulted in leakage between the tube and the element. A solution to this problem is illustrated in FIGS. 5a and 5b where inner seals 120 and 122 are disclosed between the filter elements 18 and 20 and the outer flow tube 14 which eliminate or substantially reduce the aforementioned leakage. The filters 18 and 20 are shown having beveled edges 116 and 118 extending around their tube passageways 22 and 24 and are oriented one, with respect to the other, so that the beveled edges 116 and 118 face each other. The inner seals 120 and 122 are formed in the space between the beveled edges 116 and 118 and the outer flow tube 14. The inner seals 120 and 122 are preferably formed using the sealing material 62 described above which is applied in a melted state and adheres to the outer surface of the outer flow tube 14 and the tissue layers 86 of the filter elements 18 and 20.

The outer seal 32 is applied between the filter elements 18 and 20 in essentially the same manner as described above. The combination of the outer seal 32 with the inner seals 120 and 122 substantially decreases the possibility that direct fluid flow communication will be established between the annular passageway 30 and the outside 34 of the filter elements 18 and 20. Thus, fluid to be filtered will not have an opportunity to bypass the filter elements 18 and 20 by moving directly between the annular passageway 30 and the outside 34 of the filter elements 18 and 20. Accordingly, contamination of filtered fluid by unfiltered fluid is virtually elminated.

Figure 2:
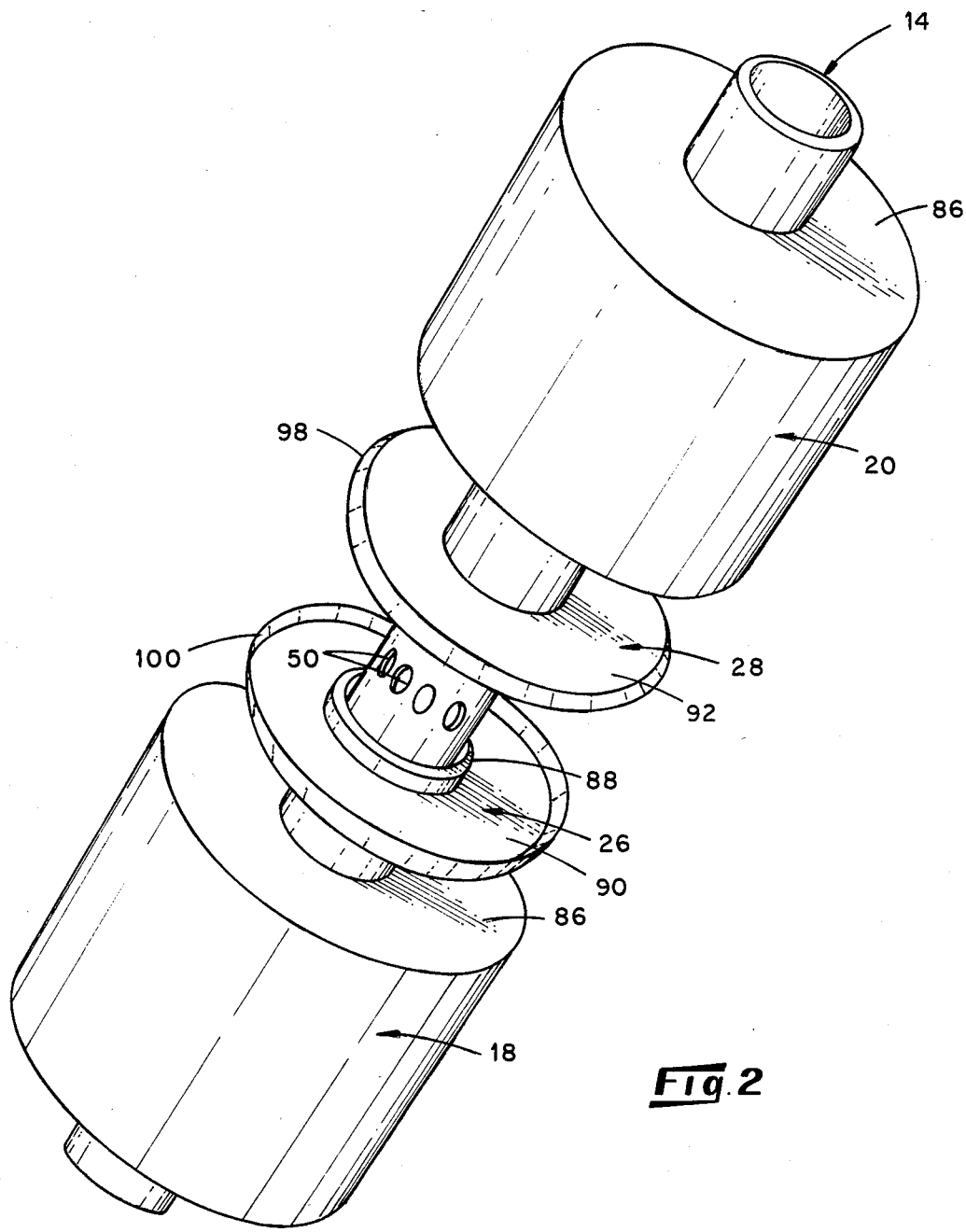
FIG. 2 is an exploded perspective view illustrating the position of the filter elements and a pair of spacer halves on the outer flow tube.
Figure 3:
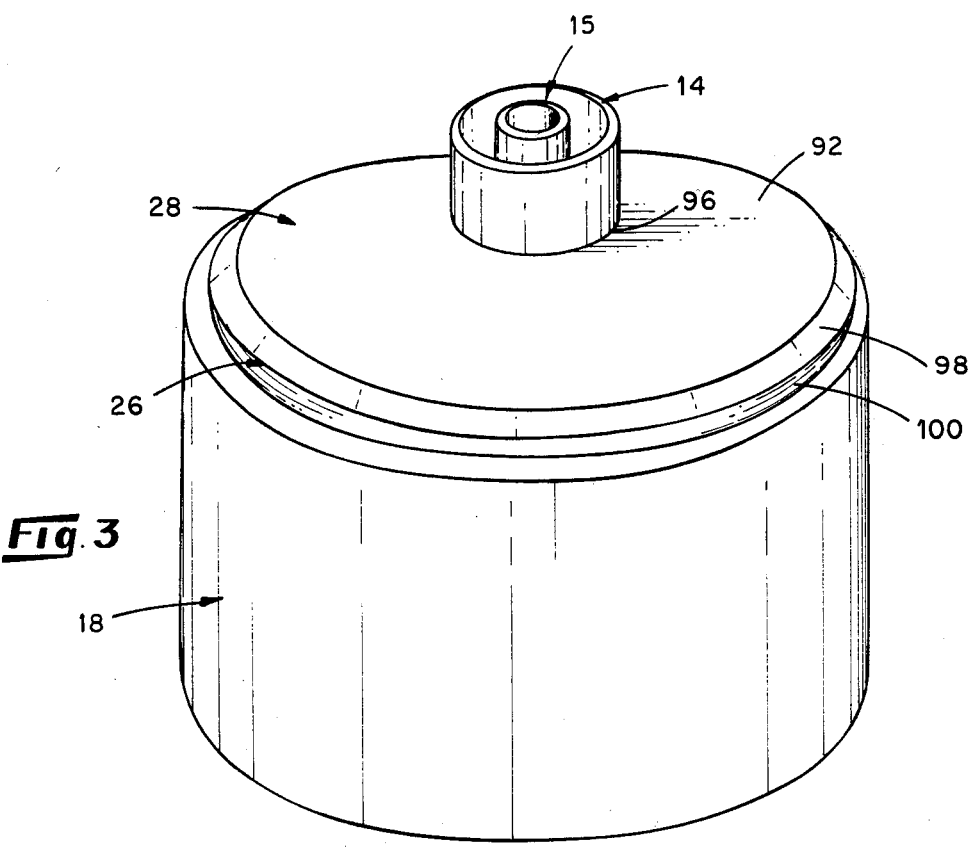
FIG. 3 is a perspective view illustrating the position of the spacer halves adjacent one of the filter elements.

Referring to FIGS. 1 and 2, a preferred method of constructing one embodiment of the filter apparatus 10 is illustrated. it should be noted that in actual practice the outer tube 14 would probably not assume the length depicted in FIG. 2. In order to show the method of construction the tube 14 must be depicted in this manner to allow a graphic perspective illustration of the method.

Referring specifically to FIG. 1, the outer tube 14 is preferably constructed from a cardboard, metal or high temperature plastic tube having a diameter slightly less than that of the tube passageways 22 and 24. The inner tube 15 is preferably formed from metal and is threaded on its inside surface at the end opposite its attachment to the bottom 40 of the canister 36 to receive the threaded portion 60 of the screw 52. The thickness of the walls of the outer tube 14 should be sufficient to withstand, without deformation, the pressure differentials expected between the outside 34 of the filter elements 18 and 20 and the axial passageway 16 inside the outer tube 14 which may exceed 100 p.s.i. The plugs 53 which are located on opposite ends of the outer flow tube 14 are also preferably formed from metal or high temperature plastic.

It should be noted that the outer flow tube 14 with the filter elements 18 and 20, the disks 26 and 28, the washer 88, and the plugs 53 secured thereon forms the replaceable part of the filter apparatus. Therefore, the ensuing description contemplates that the above-name components and the seals will be positioned and secured on the outer flow tube 14 before the latter is inserted into the canister section 36. The other components of the filter apparatus 10 described herein form the permanent part of the device and are not intended to be replaced each time the replaceable part is changed with the possible exception of the upper and lower sealing disks 58 and 68.

In constructing the replaceable part of the filter apparatus 10, the apertures 50 are first drilled or cut in the outer tube 14 so they will lie generally in the plane of the annular passageway 30 when the filter elements 18 and 20 are secured on the tube 14. A suitable adhesive material is then applied to the outer surface of the tube 14 between the apertures 50 and one end of the tube. One of the filter elements 18 and 20 is then positioned on the tube 14 so that one planar end of the element is adjacent the edge of the apertures 50. The part of the tube 14 extending out of the planar end of the element opposite the apertures 50 is then trimmed off so that the end of the tube 14 is flush with the planar end of the filter element opposite the apertures 50. One of the disks 26 and 28 is then located on the flow tube 14 adjacent the apertures 50 against the planar end of the element already secured on the flow tube 14. The disk should be oriented so that the ring extending from the disk extends away from the planar end of the element and the annular region of the disk is against the planar end (see FIG. 2). The spacer washer 88 is then located on the tube 14 so that it rests on the annular region of the disk. The other disk is then placed on the tube 14 so that the outer edges of the rings 98 and 100 of the disks 28 and 26 engage each other around their perimeters. The adhesive material is then applied to the outer surface of the remaining part of the flow tube 14 and the other filter element is positioned on the tube 14 with one of its planar ends against the disk. Before the adhesive between the other filter element and the flow tube 14 is allowed to dry, the filter elements 18 and 20 are urged toward each other until the disks 28 and 26 engage the spacer washer 88 so that the desired annular space 30 between the filter elements 18 and 20 is formed. After the adhesive dries, any remaining portion of the flow tube 14 extending out of the second-applied filter element is trimmed off so that the end of the tube 14 is flush with the planar end of the second-applied filter element. The distance between the disks 28 and 26 should be approximately equal to the diameter of the apertures 50 and the disks 28 and 26 should be in planes on opposite axial sides of the apertures 50.

At this point either the outer seal 32 can be formed or the plugs 53 can be placed in the opposite ends of the outer tube 14. Preferably, the outer seal 32 is formed first by flowing the sealing material 62 in a melted state into the area between the filter elements 18 and 20 around their outer circumferential edges. Sufficient sealing material 62 should be used so that the seal 32 will extend radially outwardly from near the outer edges of the disks 26 and 28 to the outer circumferential edge of each filter element 18 and 20, and around the periphery of the filter elements 18 and 20. Moreover, since the sealing material 62 is in a liquid state when applied, it will migrate into the edges of the tissue 86 along the planar ends of the filter elements 18 and 20 due to the absorptive properties of the tissue. And, since the mesh of the disks 26 and 28 is essentially an open work structure, the sealing material 62 will flow into the interstices of the open work. Thus, the seal 32 will extend axially from its point of migration into and between the individual tissue layers and interstices at the planar end of one of the filter elements adjacent the seal 32 to its point of migration into and between the individual tissue layers and interstices at the planar end of the other filter element adjacent the seal 32. The seal 32 will extend radially from its point of inward migration within the interstices of the open work of the disks 26 and 28 to the outer circumferential edge of the filter elements 18 and 20. When the sealing material 62 cools and hardens, it adheres to the mesh of the disks 26 and 28 and to the tissue 86 of the filter elements 18 and 20. In this manner, a unitary construction results between the disks 26 and 28, the filter elements 18 and 20 and the seal 32.

After the outer seal 32 is formed, the plugs 53 are placed in opposite ends of the outer flow tube 14. The plugs 53 are inserted into the flow tube 14 until the lip 54 of each plug 53 engages the planar end of the filter elements 18 and 20. The adhesive used between filter elements 18 and 20 and the outer flow tube 14 can also be used to secure the plugs 53 within the flow tube 14 by coating the inner surface of the latter prior to insertion of the plugs 53. After the plugs 53 are inserted into the flow tube 14, the sealing material 62 is transmitted to the annular spaces 70 of the plugs 53 by flowing the sealing material 62 in a melted state through the passageways 64 into the spaces 70. When the material 62 cools and hardens it adheres to the plugs 53 and the inner surface of the outer flow tube 14 forming therebetween upper and lower tube seals 130 and 132 which help prevent fluid leakage from the fluid space 34 outside the filter elements 18 and 20 into the upper and lower ends, respectively, of the axial passageway 16 inside the outer flow tube 14.

The replaceable part of the filter apparatus 10 is now ready for placement into the canister section 36. Prior thereto, the lower sealing disk 68 is positioned on the inner flow tube 15 in contact with the washer 66. And to aid in placement of the replaceable part within the canister section 36, a removable handle 134 is used. The handle 134 can be seen in FIG. 1 assuming an arch-shape extending across the plug 53 at the top of the plug 53 adjacent the spring 59. A pair of inwardly directed arms 136*a* and 136*b* extend from the lower part of the arch of the handle 134 into wells 138*a* and 138*b* provided in each plug 53. The arms 136*a* and 136*b* should not be too firmly secured within the wells 138*a* and 138*b* so that after the replaceable part is placed into the canister 36, the handle 134 can be pivoted about the arms 136*a* and 136*b* to one side of the plug 53. This prevents the handle 134 from interfering with the functions of the spring 59 and tightening screw 52. It should be noted that the handle 134 is shown in full in FIG. 1 so that its structure and function may be described but in normal practice would not be fully visible from this vantage as it would be to one side of the plug 53.

Care is taken during location of the replaceable part on the lower sealing disk 68 so that the outer flow tube 14 is essentially concentric with the inner flow tube 15. This is accomplished by insuring that the axial passageways 56 of the plugs 53 and the inner flow tube 15 cooperate to form annular spaces between the plugs 53 and the inner flow tube 15 on each end of the tube 15. After the plug 53 at the bottom of the replaceable part is seated on the lower seating disk 68, the upper sealing disk 58 is placed in the countersunk portion of the upper plug 53. And it should be noted that the inner flow tube 15 is dimensioned in length so that it extends about half way through the axial passageway 56 of the plug 53 adjacent the spring 59.

A washer 140 is located on the upper surface of the disk 58 and has an outer diameter essentially equal to the diameter of the shoulder 57 where it meets the beveled surface. The inner diameter of the washer 140 is slightly greater than the diameter of the unthreaded part 61 of the screw 52. The spring 59 is then placed on the washer 140 and the screw 52 is inserted down into the spring 59 through the washer 140 and the upper sealing disk 58 and into the inner flow tube 15. The handles 72*a* and 72*b* are then utilized to turn the screw 52 so that the threaded part 60 enters the inner flow tube 15. After a few turns, the upper sealing disk 58 should be moved down into the countersunk portion of the plug 53 so that it engages the upper surface of the shoulder 57. Also, by virtue of the beveled surface of the countersunk portion, the disk 58 is compressed inwardly against the screw 52 as the disk 58 is moved down into the countersunk portion so that by the time the disk 58 engages the shoulder 57, a seal has been formed between the disk 58 and the screw 52. And the washer 140 prevents the disk 58 from deforming around the lowermost curl of the spring 59 as the disk 58 is pushed down into the countersunk portion.

When the upper sealing disk 58 has been seated against the shoulder 57, the screw 52 is turned a few more times so that the spring 59 will impart a force on the removable part. In this manner, the upper and lower sealing disks 58 and 68 are compressed against the surfaces with which they are in contact so that leak-proof seals are formed at opposite ends of the removable part. The spring 59 is sufficiently strong so that it will maintain the proper force on the disks 58 and 68 to prevent leakage. And, the material used to form the disks 58 and 68 is of sufficient rigidity so that it does not deform under the force of the spring 59 beyond that required to form the seal.

After the replaceable part is secured within the canister 36 as described above, the dome section 38 of the shell 12 is placed on the canister 36 with the lip 41 of the dome 38 in contact with the circular seal 44. The tightening band 45 is then applied to the junction between the dome 38 and the canister 36. Preferably, the inside of the band 45 is configured so that when it is tightened, it urges the lips 41 and 42 toward each other compressing the circular seal 44 to form a leak-proof junction. Also, the retaining sleeve 43 serves to prevent the lip 41 on the dome from being deformed radially inwardly as the band 45 is tightened, and prevents the circular seal 44 from sliding inwardly when it is compressed.

The embodiments of FIGS. 5a and 5b are constructed generally in the method described above with the following modifications. A cutting tool or other similar device is used to form the beveled edges 116 and 118 in the first and second filter elements 18 and 20. Also, the plurality of disks 110 and 111 are used without the disks 110 and 111 having formed thereon rings such as the rings 98 and 100 described above. One substantial deviation from the method described above involves location of the inner seals 120 and 122 in the space between the beveled edges 116 and 118 and the flow tube 14. After the first filter element 18 is secured on the outer flow tube 14, the sealing material 62 is applied as described above in a melted state to form the seal 120. The washer 114 is then placed on the outer tube 14 against the sealing material 62 and as the material 62 cools and hardens it adheres to all the surfaces with which it has made contact and forms the seal 120. The disks 110 and 111 are then located on the outer tube 14 against the washer 114. The other washer 112 is placed on the disks 110 after which the second filter element 20 is located on the outer tube 14. Before the second filter element 20 is moved into contact with the other components already located on the outer tube 14, the sealing material 62 is applied in a melted state on the surface of the washer 112 adjacent the second filter element 20. Immediately after application of the sealing material 62, the second filter 20 is moved along the outer tube 14 until an exposed surface 124 of the sealing material 62 makes contact with the beveled edge 118 of the second filter element 20 forcing the material 62 to fill the space between the flow tube 14 and the beveled edge 118. Thereafter, the sealing material 62 is allowed to cool and harden whereby it adheres to all the surfaces with which it has made contact and forms the seal 122. The replaceable part is then completed in the manner described above after which the assembly is ready to be inserted into the canister section 36 of the shell 12.

Referring to FIG. 6, there is shown a preferred method of applying the sealing material 62 to form the outer seal 32. The outer tube 14 is placed on a lathe or other suitable device to rotate the assembly. A nozzle 126 is used to flow the melted sealing material 62 between the filter elements 18 and 20 while the assembly rotates. In this manner, the rate of flow of the sealing material 62 is controlled so that the outer seal 32 is evenly distributed between the filter elements 18 and 20.

Although particular embodiments of the present invention have been described in the foregoing detailed description, it will be understood that the invention is capable of numerous rearrangements, modifications and substitutions of parts without departing from the scope of the invention.

What is claimed:

1. A filter apparatus for filtering fluids from an external fluid source, comprising:
   at least first and second annular filter elements, each of said filter elements having a centrally located passageway and being constructed to allow essentially only axial flow;
   a flow tube disposed within said passageways of said filter elements, said filter elements being coaxially disposed adjacent each other on said flow tube;
   a shell for receiving and containing said filter elements and said flow tube;
   a first port located on said shell for providing fluid flow communication between the source of fluid and said filter elements;
   a second port located on said shell providing fluid flow communication from said flow tube through said shell;
   spacing means disposed between said filter elements to form an annular passageway therebetween, said spacing means extending radially outwardly from near said flow tube to near the outer edge of each of said filter elements and having interstices to provide flow communication between said filter elements and said annular passageway;
   means disposed adjacent said annular passageway on said flow tube to provide fluid flow communication between said annular passageway and said flow tube; and an outer seal disposed between said filter elements extending radially outwardly from the outer edge of said spacing means to the outer circumferential edge of each of said filter elements, and extending around the periphery of said filter elements, said outer seal adhering to each of said filter elements adjacent the seal around its circumference and along its radial length to prevent unfiltered fluid from contaminating the filtered fluid.

2. The apparatus of claim 1 further comprising:
   a circumferential space formed in each filter element adjacent said flow tube; and
   an annular seal disposed in each of said circumferential spaces and adhering to both said tube and said filter element.

3. The apparatus of claim 1, wherein said outer seal comprises a thermoplastic material having a melting temperature higher than the highest expected operating temperature of the filter apparatus.

4. The apparatus of claim 1, wherein said spacing means comprises at least one annular disk having a centrally located aperture of about, but greater than, the dimension of the cross section of said center tube, said disk and ring comprising a continuous semi-rigid resiliently deformable mesh.

5. The apparatus of claim 4, wherein said outer seal adheres to said mesh of said disk and extends radially outwardly from the interstices of said mesh adjacent said seal, and extends axially between said filter elements so that a unitary construction results between said disk, said filter elements and said seal.

6. The apparatus of claim 4, wherein said spacing means further comprises a spacer washer located on the side of said disks adjacent said first filter element to maintain a space between said disk and said first filter element.

7. The apparatus of claim 6, wherein said disk is in a state of axial compression and is resiliently deformed to form said radial passageway.

8. A filter apparatus for filtering fluids from an external fluid source, comprising:
- at least first and second filter elements, each of said filter elements having a centrally located passageway;
- a flow tube disposed within said passageways of said filter element, said filter elements being coaxially disposed adjacent each other on said flow tube;
- a shell for receiving and containing said filter elements and said flow tube;
- a first port located on said shell for providing fluid flow communication between the source of fluid and said filter elements;
- a second port located on said shell providing fluid flow communication from said flow tube through said shell;
- spacing means disposed between said filter elements to form an annular passageway therebetween, said spacing means extending radially and outwardly from near said flow tube to near the outer edge of each of said filter elements;
- each of said filter elements having a beveled edge extending around the circumference of said passageway on the end of said passageway adjacent the other filter element so that an annular space is formed between each of said filter elements and said flow tube tube extending around said flow tube;
- inner seals disposed around said flow tube adjacent said beveled edges of said filter elements, said inner seal adhering to both said flow tube and said filter elements and generally filling said annular space;
- means disposed adjacent said annular passageway on said flow tube to provide fluid flow communication between said annular passageway and said flow tube; and
- an outer seal disposed between said filter elements extending radially outwardly from adjacent the outer edge of said spacing means to the outer circumferential edge of each of said filter elements, and extending around the periphery of said filter elements, said outer seal adhering to each of said filter elements adjacent the seal around its circumference and along its radial length to prevent unfiltered fluid from contaminating the filtered fluid.

9. The apparatus of claim 8, wherein each of said inner seals outer seal further comprise a thermoplastic material having a melting temperature higher than the highest expected operating temperature of the filter apparatus.

10. A filter apparatus for filtering fluids from an external fluid source, comprising:
- at least first and second filter elements, each of said filter elements having a centrally located passageway;
- a flow tube disposed within said passageways of said filter elements, said filter elements being coaxially disposed adjacent each other on said flow tube;
- a shell for receiving and containing said filter elements and said flow tube;
- a first port located on said shell for providing fluid flow communication between the source of fluid and said filter elements;
- a second port located on said shell providing fluid flow communication from said flow tube through said shell;
- spacing means disposed between said filter elements to form an annular passageway therebetween, said spacing means extending radially outwardly from near said flow tube to near the outer edge of each of said filter elements;
- a plug dimensioned to fit within said flow tube adjacent the end of one of said filter elements opposite said annular passageway;
- an annular groove disposed within said plug adjacent said filter element to form an annular space between said plug and said filter elements;
- an adhesive disposed within said annular space for creating a seal between said plug and said filter element;
- means disposed adjacent said annular passageway on said flow tube to provide fluid flow communication between said annular passageway and said flow tube; and
- an outer seal disposed between said filter elements extending radially outwardly the outer edge of said spacing means to the outer circumferential edge of each of said filter elements, and extending around the periphery of said filter elements, said outer seal adhering to each of said filter elements adjacent the seal around its circumference and along its radial length to prevent unfiltered fluid from contaminating the filtered fluid.

11. The apparatus of claim 10 wherein said plug further comprises a passageway disposed within said plug for transmitting said adhesive to said annular space when said plug is located in said flow tube.

12. A filter apparatus for filtering fluid from an external fluid source, comprising:
- at least first and second filter elements, each of said filter elements having a centrally located passageway;
- a flow tube disposed within said passageways of said filter elements, said filter elements being coaxially disposed adjacent each other on said flow tube;
- a shell for receiving said filter elements and said flow tube;
- a first port located on said shell for providing fluid flow communication between the source of fluid and said filter elements;
- a second port located on said shell providing fluid flow communication from said flow tube through said shell;
- spacing means disposed between said filter elements to form an annular passageway therebetween, said spacing means extending radially outwardly from near said flow tube to near the outer edge of each of said filter elements and having first and second spacer halves, each of said first and second spacer halves comprising:
  an annular disk having a centrally located aperture of about, but greater than, the dimension of the crosssection of said center tube;
  a circular ring extending downwardly and outwardly from the outer edge of said disk and extending around the perimeter of said disk so that each of said halves forms a truncated cone; and
  said disk and said ring being continuous and comprising semi-rigid resiliently deformable mesh having fluid flow through characteristics to allow sufficient axial flow adjacent said filter elements;
  said first and second spacer halves coaxially located on said flow tube to form said annular passageway;
  means disposed adjacent said annular passageway on said flow tube to provide fluid flow communication between said annular passageway and said flow tube; and
  an outer seal disposed between said filter elements extending radially outwardly from adjacent the outer edge of said spacing means to the outer circumferential edge of each of said filter elements, and extending around the periphery of said filter elements, said outer seal adhering to each of said filter elements adjacent the seal around its circumference and along its radial length to prevent unfiltered fluid from contaminating the filtered fluid.

13. The apparatus of claim 12, wherein said spacing means further comprises at least one spacer washer located between said disks to maintain a space therebetween.

14. The apparatus of claim 12, wherein said spacing means is in a state of axial compression and is resiliently deformed to form said radial passageway.

15. The apparatus of claim 14, wherein said outer seal further comprises a thermoplastic material having a melting temperature higher than the highest expected operating temperature of the filter apparatus.

16. The apparatus of claim 15, wherein said outer seal adheres to said mesh of said spacer halves and extends radially outwardly from the interstices of said mesh adjacent said outer seal, and extends axially between the filter elements so that a unitary construction results between said spacer halves, said filter elements and said outer seal.

17. The apparatus of claim 12, wherein said first and second spacer halves are oriented one with respect to the other such that each of said rings extends from said disks towards the other and said rings engage each other along their outer edges forming two oppositely directed truncated cones joined together at their bases.

18. The apparatus of claim 17, wherein each of said circular rings extends from the plane made by each of said disks at about a 45 degree angle.

19. An axial flow filter apparatus for filtering fluids from a fluid source, comprising:
  at least first and second filter elements having a centrally located axially oriented passageway, said filter elements comprising spirally wound tissue layers and having a beveled edge extending around the circumference of said axially oriented passageway;
  a flow tube disposed within said axial passageways of said filter elements and extending generally along the length of said filter apparatus, said filter elements being coaxially disposed adjacent each other on said flow tube;
  a shell for receiving and containing said filter elements and said flow tube;
  a second port located on said shell providing fluid flow communication from said flow tube through said shell;
  a first port located on said shell providing fluid flow communication between the source of fluid and said filter elements;
  spacing means disposed between said filter elements to form an annular passageway therebetween;
  a plurality of spaced apart apertures disposed on said flow tube adjacent said annular passageway providing fluid flow communication between said annular passageway and said flow tube;
  inner seals disposed between and adhering to each of said beveled edges of said filter elements and said flow tube to prevent passage of unfiltered fluid in the space between said filter elements and said flow tube; and
  an outer seal disposed between said filter elements extending radially outwardly from said spacing means to the outer edge of said filter elements, and extending axially from between the individual tissue layers of said first filter element along its edge adjacent the outer seal to between the individual tissue layers of said second filter element along its edge adjacent the outer seal, said outer seal adhering to said spacing means and said tissue layers.

20. The apparatus of claim 19 wherein said spacing means comprises:
  a plurality of fluid pervious disks having centrally located apertures of about, but greater than, the dimension of the cross-section of said center tube and said disks being coaxially located adjacent each other on said flow tube between said filter elements; and
  first and second spacer washers coaxially located on said flow tube on opposite axial sides of said disks between said disks and said inner seals.

21. The apparatus of claim 20 wherein said disks comprise:
  a middle wire mesh disk; and
  two outer wire mesh disks disposed on opposite axial sides of said middle disk and having a sufficiently fine mesh to prevent said filter elements from deforming though the openings in the mesh of said outer disks and filling said annular passageway.

22. The apparatus of claim 19 wherein each of said inner seals and said outer seal comprises a thermoplastic adhesive material having a melting temperature higher than the higest expected operating temperature of the filter apparatus.

23. A method for constructing a seal between two filter elements having a spacer located therebetween and an axially oriented flow tube extending through their centers, comprising:
  positioning one of the filter elements on the flow tube;
  locating the spacer on the flow tube adjacent the filter elements;
  positioning the other filter element on the flow tube adjacent the spacer so that the spacer is between the two filter elements and maintains a space therebetween;

heating an adhesive sealing material to above its melting temperature, the melting temperature being higher than the highest expected operating temperature of the filter elements;

flowing the melted sealing material between the filter elements around their outer edges so that the material extends radially from the outer edge of the spacer to the outer edges of the filter elements and extends axially from the end of one filter element adjacent the spacer to the end of the other filter element adjacent the spacer; and allowing the sealing material to cool to below its melting temperature so that the seal adheres to the filter elements and the spacer.

* * * * *